United States Patent
Moser et al.

(10) Patent No.: US 10,095,042 B2
(45) Date of Patent: Oct. 9, 2018

(54) BEAM TRANSFORMATION ELEMENT, DEVICE FOR TRANSFORMING ELECTROMAGNETIC RADIATION, METHOD FOR PRODUCING A BEAM TRANSFORMATION ELEMENT, AND METHOD FOR TRANSFORMING AN ELECTROMAGNETIC EMISSION

(71) Applicant: FISBA OPTIK, St. Gallen (CH)

(72) Inventors: Hansruedi Moser, Hinterforst (CH); Martin Forrer, St. Gallen (CH)

(73) Assignee: Fisba Optik AG, St. Gallen (CH)

( * ) Notice: Subject to any disclaimer, the term of this patent is extended or adjusted under 35 U.S.C. 154(b) by 193 days.

(21) Appl. No.: 14/425,684

(22) PCT Filed: Sep. 10, 2013

(86) PCT No.: PCT/EP2013/068713
§ 371 (c)(1),
(2) Date: May 4, 2015

(87) PCT Pub. No.: WO2014/040984
PCT Pub. Date: Mar. 20, 2014

(65) Prior Publication Data
US 2015/0301340 A1 Oct. 22, 2015

(30) Foreign Application Priority Data
Sep. 13, 2012 (EP) .................... 12184169

(51) Int. Cl.
*G02B 27/09* (2006.01)
*G02B 3/00* (2006.01)
*G02B 19/00* (2006.01)

(52) U.S. Cl.
CPC ....... *G02B 27/0966* (2013.01); *G02B 3/0031* (2013.01); *G02B 3/0056* (2013.01);
(Continued)

(58) Field of Classification Search
CPC .......... G02B 3/0031; G02B 27/0966; G02B 3/0056; G02B 19/0057; G02B 27/0905; G02B 27/0961
(Continued)

(56) References Cited

U.S. PATENT DOCUMENTS 5,523,889 A  6/1996 Bewsher
6,471,372 B1 10/2002 Lissotschenko et al.
(Continued)

FOREIGN PATENT DOCUMENTS

EP  0 961 152 A1  12/1999
EP  1 006 382 A1  6/2000
(Continued)

OTHER PUBLICATIONS

Japanese Office Action issued in corresponding Japanese Patent Application No. 2015-531538 dated Jul. 4, 2017.

*Primary Examiner* — Zachary Wilkes
*Assistant Examiner* — George G King
(74) *Attorney, Agent, or Firm* — Davis & Bujold PLLC; Michael J. Bujold (57) ABSTRACT

A beam transformation element (1) for transforming electromagnetic radiation, in particular laser radiation, comprising an irradiation surface (2) and an emission surface (8). The irradiation surface (2) comprises at least four cylindrical segments (3), wherein each cylindrical segment (3) has at least two adjacent segments. A cylinder longitudinal axis (4) of a first cylindrical segment (3) is not parallel to each cylinder longitudinal axis (4) of an adjacent cylindrical segment (3).

19 Claims, 9 Drawing Sheets (52) U.S. Cl.
CPC ..... *G02B 19/0057* (2013.01); *G02B 27/0905* (2013.01); *G02B 27/0961* (2013.01)

(58) Field of Classification Search
USPC .................. 359/668–670, 619–626, 641
See application file for complete search history.

(56) References Cited

U.S. PATENT DOCUMENTS

| | | | |
|---|---|---|---|
| 6,816,311 B1 * | 11/2004 | Lissotschenko | G02B 3/06 359/618 |
| 7,027,228 B2 | 4/2006 | Mikhailov | |
| 7,260,131 B2 | 8/2007 | Grenier et al. | |
| 7,483,214 B2 | 1/2009 | Yoshida et al. | |
| 9,448,410 B2 | 9/2016 | Mikhailov | |
| 2005/0105189 A1 * | 5/2005 | Mikhailov | G02B 6/4204 359/641 |
| 2005/0134965 A1 * | 6/2005 | Poulsen | B29D 11/00278 359/619 |
| 2009/0109667 A1 | 4/2009 | Cheng et al. | |
| 2011/0305256 A1 * | 12/2011 | Chann | G02B 27/0905 372/75 |

FOREIGN PATENT DOCUMENTS

| | | |
|---|---|---|
| EP | 1 528 425 A1 | 5/2005 |
| JP | H0843610 A | 2/1996 |
| JP | 2000137139 A | 5/2000 |
| JP | 2005134916 A | 5/2005 |
| JP | 2008216419 A | 9/2008 |
| WO | 2011/109763 A2 | 9/2011 |
| WO | 2012/058683 A2 | 5/2012 |
| WO | 2012076651 A1 | 6/2012 |

\* cited by examiner

BEAM TRANSFORMATION ELEMENT, DEVICE FOR TRANSFORMING ELECTROMAGNETIC RADIATION, METHOD FOR PRODUCING A BEAM TRANSFORMATION ELEMENT, AND METHOD FOR TRANSFORMING AN ELECTROMAGNETIC EMISSION

This application is a National Stage completion of PCT/EP2013/068713 filed Sep. 10, 2013, which claims priority from European patent application serial no. 12184169.6 filed Sep. 13, 2012.

FIELD OF THE INVENTION

The invention relates to a beam transformation element, a device for optical beam transformation, a method for producing a beam transformation element and a method for transforming an electromagnetic emission in accordance with the preamble of the independent claims.

BACKGROUND OF THE INVENTION

In optical technology, particularly in laser optics, improving the beam quality and obtaining the greatest possible power density is an ever recurring problem.

EP 0 951 152 has disclosed an arrangement for rotating individual laser diode emissions, wherein the rotation is achieved by prisms. As a result of rotating the individual emissions from the laser diodes, the focusability of the light emissions is improved. However, producing the arrangement and the prisms is complicated and expensive. The necessary highly precise assembly of the micro-optical components is complex and time consuming.

Document EP 1 006 382 has disclosed an arrangement and a device for optical beam transformation. The device consists of an array of cylinder lens segments which are inclined parallel to one another at 45°. Such a cylinder lens element comprises discontinuities and is therefore difficult to produce. Moreover, the maximum beam diameter is restricted by the cylinder width.

U.S. Pat. No. 7,260,131 has disclosed a device for symmetrizing laser radiation from a laser diode system. The device comprises cylindrical surfaces, the cylinder axes of which are respectively aligned parallel to one another and next to one another. This leads to discontinuities in the surface, making production very expensive and difficult.

WO 2011/109763 has disclosed a system and a method for reconfiguring and rotating a light beam. Here, the individual emissions of a laser diode are initially rotated by 90° and subsequently reconfigured to form an overall beam. Thus, the number and the distances of the individual laser diodes must in this case be matched to the individual rotation elements. This makes the method expensive and complicated.

SUMMARY OF THE INVENTION

It is therefore an object of the invention to avoid the disadvantages of the prior art and, in particular, develop a beam transformation element, a device for optical beam transformation, a method for producing a beam transformation element and a method for transforming an electromagnetic emission, which are simple to produce but nevertheless enable a beam transformation which is as effective and low-loss as possible.

This object is achieved by a beam transformation element, a device for optical beam transformation, a method for producing a beam transformation element and a method for transforming an electromagnetic emission in accordance with the independent claims.

In order to achieve the objective stated above, a beam transformation element leads to the transformation of electromagnetic radiation, in particular laser radiation. The beam transformation element comprises an incoming radiation surface and an output radiation surface, wherein the incoming radiation surface comprises at least four cylinder segments. Each cylinder segment has at least two adjacent segments. A respective longitudinal cylinder axis of a first cylindrical segment is embodied in a manner not parallel to each respective longitudinal cylinder axis of an adjacent cylinder segment.

A cylinder segment is part of a surface having the form of a cylinder or a cylinder portion. Here, a cylinder segment can merge continuously into a second cylinder segment. Continuous within the meaning of the application means without steps or shoulders or jumps.

Within the meaning of the application, a longitudinal cylinder axis corresponds to the axis of rotation of the cylinder, wherein the longitudinal cylinder axis is displaced by the radius of the cylinder to the surface of the cylinder.

A cylinder within the meaning of the application comprises aspherical and spherical cylinders.

The cylinder segments preferably have a convex embodiment.

Within the meaning of the application, an adjacent segment is a segment which comprises a line of contact with the adjacent segment. Therefore, an adjacent segment does not only have punctiform contact with the next segment.

Such a beam, transformation element leads to an optimum use of the surface of the cylindrical elements and therefore to an improved optical power density. Therefore, a larger beam can pass through the cylindrical element, such that an improved fill is achieved in an array. Improved collimation is achieved along the fast axis, as a result of which the beam can be focused in an improved manner, leading to a higher power density.

The radiation transformation element can have a longitudinal axis and the longitudinal cylinder axes can be respectively inclined by 45° in relation to the longitudinal axis of the beam transformation element.

Within the meaning of the application, the longitudinal axis of the beam transformation element corresponds to the side of the support area of the beam transformation element during use.

Mirroring of the incident radiation at the longitudinal cylinder axis can be achieved as a result of a 45° incline of the longitudinal cylinder axes. Naturally, other angles between the longitudinal axis of the beam transformation element and the longitudinal cylinder axis are furthermore conceivable.

Such mirroring is advantageous, particularly in the case of asymmetrical radiation such as e.g. laser diode radiation, since the beam parameter product is symmetrized, particularly in an array. The beam quality of the fast axis of an array is improved, and so the beam is focusable in an improved manner.

The output radiation surface can be formed in a mirror symmetrical manner in relation to the incoming radiation surface, wherein the maximum distance between incoming radiation surface and output radiation surface preferably corresponds to twice a focal length of the cylinder segments. Therefore, the focus of a cylinder segment of the incoming radiation surface lies on the focus of the cylinder segment of the output radiation surface arranged opposite.

A mirror symmetrical embodiment of the beam transformation element, in which the maximum distance corresponds to twice the focal length of the cylinder segment, leads to the beams not being focused or becoming divergent. The beam transformation therefore occurs exclusively within the beam. In the case of a longitudinal cylinder axis inclined in relation to an incident light beam, the input beam is mirrored at this axis.

The cylinder segments can have a spherical or aspherical embodiment.

A spherical embodiment leads to cheaper production costs. An aspherical embodiment leads to an improved optical imaging quality and hence to an increased power density, particularly in the case of focusing into an optical fiber.

The beam transformation element can have dimensions of 0.5-4 mm in height, 1.5-20 mm in width and 1-7 mm in depth.

The beam transformation element is produced from a material that is transparent to the respective laser light, more particularly from optical glass.

Furthermore, a device for optical beam transformation, comprising at least one laser light source and a beam transformation element as described above, also leads to a solution of the objective stated above.

The light emitted by the laser light source is transformed, more particularly rotated, by the beam transformation element in such a way that the whole area of the cylindrical element can be used for transformation purposes. Therefore, lower losses are incurred. Moreover, this enables a larger beam cross section after the collimation, leading to improved focusability.

The laser light source is arranged in such a way that the emitted light is incident substantially perpendicularly on the vertices of the cylinder segments of the incoming radiation surface.

The laser light source can comprise an array of semiconductor laser elements, wherein a distance between the semiconductor laser elements corresponds to the length of a cross section parallel to the longitudinal axis of the beam transformation element of, in accordance with a first aspect, two cylinder segments or of, in accordance with a second aspect, one cylinder segment or of, in accordance with a third aspect, less than one cylinder segment.

In a first aspect, the non-rotationally symmetric light emission from the semiconductor laser elements is incident on the beam transformation element in such a way that the center of the light emission (the point of intersection between the two connection lines of the greatest extent of the light emission in two dimensions) is aligned onto a point of intersection of two longitudinal cylinder axes. The light emission, which consists of individual beam surface elements, is therefore transformed by four individual cylinder segments. In the respective cylinder segments, the beam surface elements A, B, C, D are respectively mirrored at the longitudinal cylinder axis of the cylinder element such that the beam surface elements A', B', C' D' are produced. The outer contour of the beam is therefore rotated by 90°. Therefore, the distance between the semiconductor laser elements corresponds to the distance between two parallel longitudinal cylinder axes.

In a second aspect, the non-rotationally symmetric light emission from the semiconductor laser elements is incident on the beam transformation element in such a way that the emission of respectively one semiconductor laser element is incident on exactly one cylinder element. Therefore, one semiconductor laser element is formed per cylinder element. The incident emission of a semiconductor laser element is respectively mirrored at the longitudinal cylinder axis of the respective cylinder segment in such a way that the contour of the laser emission is rotated by 90°.

In a third aspect, the arrangement of the cylindrical segments on the beam transformation element is therefore independent of the distance (pitch) of the semiconductor laser elements. This simplifies the production of a beam transformation element and the production of the device for optical beam transformation and leads to more expedient production and operation costs.

The distance (pitch) of the semiconductor laser elements within the meaning of the application is the distance between the center point of a first semiconductor element and the center point of a second semiconductor element.

The advantage of the embodiment in accordance with the first, second and the third aspect lies in the achievement of a higher power density.

The device can comprise the following elements, through which the emissions of the laser light sources pass:

A first collimation device for collimating the emissions in the first plane, wherein the first collimation device is preferably arranged between the laser light source and the beam transformation element;

A second collimation device for collimating the emissions in the second plane, wherein the second collimation device is preferably arranged downstream of the beam transformation element in a direction of propagation of the emission.

The first collimation direction leads to collimation in a first plane such that strongly diverging planes of the beam, such as e.g. the fast axis, can already be collimated before they are strongly divergent. This leads to an improved beam quality. The second collimation device leads to a beam that is collimated in two planes and therefore reduces the divergence of the overall beam. This leads to an improved beam quality.

Within the meaning of the application, the direction of propagation of the emission is defined as a normal to the fast axis and the slow axis in a direction extending away from the semiconductor laser element.

Moreover, in the device, a combination lens for combining the individual emissions in a first dimension to form a combined beam, a dispersion element for receiving and transmitting the combined beam, and, optionally, a partly reflecting element, which partly decouples the combined beam and partly reflects it back into the emitter, can be formed.

Such a device enables a generation of a stable laser emission and, in particular, the combination of laser light with different wavelengths from the semiconductor laser elements. A beam combined thus can be optimally coupled into an optical fibre without significant power losses.

Furthermore, a method for producing a beam transformation element as described above leads to the objective stated above being achieved, wherein the method comprises the following steps:

Introducing a bi-cylindrical structure into an optical glass by a molding/forming method or by a lithography process;

Preferably separating out an array from the optical glass such that the longitudinal cylinder axes of the cylinder segments substantially have a 45° angle in relation to the longitudinal and transverse sides of the array.

Within the meaning of the application, a bi-cylindrical structure is a structure which comprises two cylindrical forms that are rotated by an angle in relation to one another. The preferred angle is 90°, but other angles are also conceivable.

Therefore, the beam transformation element can be produced in a quick and cost-effective manner. Moreover, the produced beam transformation element is of optimal quality.

Furthermore, a method for transforming an electromagnetic emission, more particularly one or more laser beams, comprising a beam transformation element as described above leads to the objective specified above being achieved. An emission of an emitter is transformed by either one or four or more cylindrical segments.

Such a method is advantageous in that a beam transformation element can be produced in a cost-effective manner, which beam transformation element simultaneously optimizes the power density and focusability of the laser emission. Moreover, it is possible to use the beam transformation element independently of the distance of the individual emitters from one another. The method can therefore be carried out in a simpler and more cost effective manner. Moreover, a beam transformation element produced thus comprises the advantages of the team transformation element as described above.

The emission can be passed onto the beam transformation element in such a way that, if it is incident on a longitudinal cylinder axis of the at least one cylinder segment of the beam transformation element, which longitudinal cylinder axis is arranged at an angle of 45° to a fast axis of the electromagnetic emission, a rotation of the outer contour of the emission through 90° is achieved.

Such an arrangement leads to mirroring at the longitudinal cylinder axis and thus, ultimately, to a rotation of the outer form of the electromagnetic emission through 90°. In this manner, the beam parameter product can be symmetrized and hence the beam quality can be improved.

The emissions can be combined to form a combined beam and dispersed at a dispersive element.

The combined beam obtainable thus has a higher beam quality and, by means of the dispersive element, the emitters on an array are stabilized at different wavelengths, as a result of which the beam can be combined and focused in an improved fashion. Thus, the power density is increased.

The combined beam can be partly reflected back into the cavity of a laser.

By means of a reflection, the emission wavelength of the individual emitters can be stabilized and the wavelengths of the individual emitters become more narrow-band, as a result of which a superposition becomes possible.

The emissions can be coupled into an optical fiber.

By means of coupling into an optical fiber, the emission can be guided in a controlled manner to a specific location and put to further use there.

Furthermore, the optical fiber may contain laser active media such that the emissions can also be used for stimulating a further emission.

The emissions can be collimate in a direction of the fast axis and in a direction of the slow axis, wherein, preferably, the collimation of the fast axis is performed prior to the transformation in the beam transformation element when viewed in a direction of propagation of the emission.

Such a procedure improves the beam quality and therefore leads to improved processing results by the combined beam.

BRIEF DESCRIPTION OF THE DRAWINGS

Below, the invention will be explained in more detail on the basis of exemplary embodiments using figures. In detail.

DETAILED DESCRIPTION OF THE PREFERRED EMBODIMENTS

Figure 1:
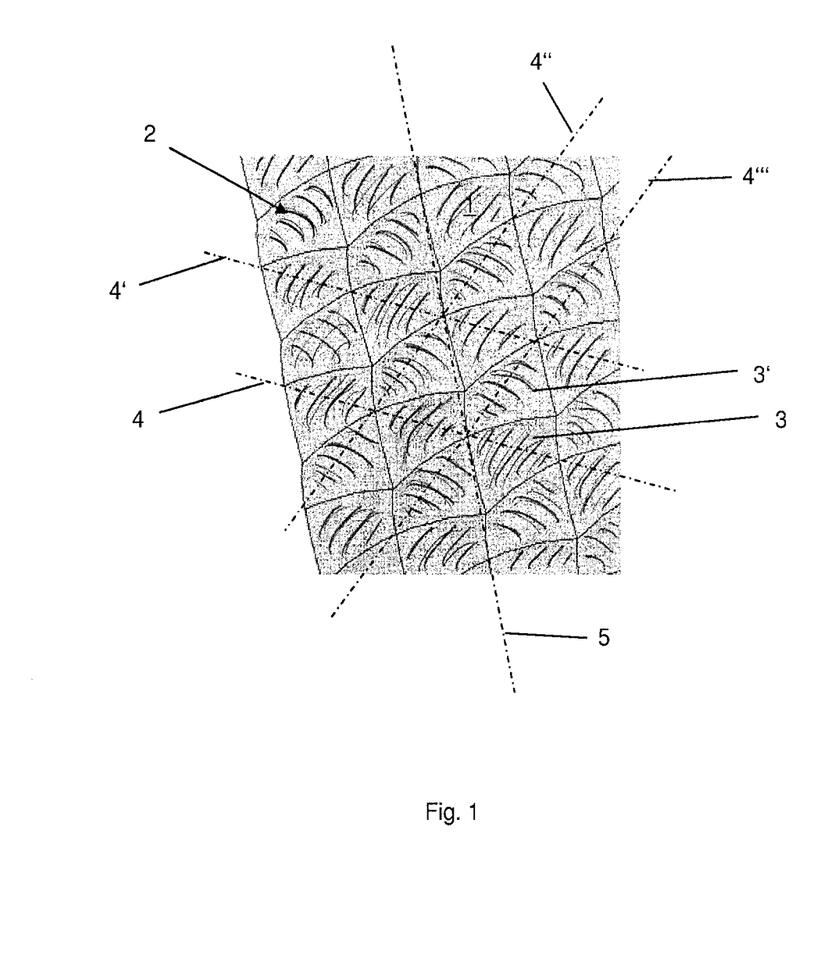
FIG. 1 shows a section of a surface of a beam transformation element.

FIG. 1 shows a portion of an incoming radiation surface 2 of a beam transformation element 1. Formed on the surface are cylinder segments which are aligned at a 90° angle in relation to one another. Each cylinder segment 3, 3' has a longitudinal cylinder axis 4, 4', 4", 4'". The longitudinal cylinder axes 4, 4', 4", 4'" are formed at a 45° angle in relation to the longitudinal axis 5 of the beam transformation element 1. As a result of the crossed arrangement of the cylinders, cylinder segments 3, 3' which respectively only have one curvature are formed. Therefore, the respectively adjacent cylinder segments 3, 3' of a cylinder segment 3, 3' respectively have a longitudinal cylinder axis 4, 4' which is perpendicular to the longitudinal cylinder axis 4", 4'" of the cylinder segment 3, 3'. The transitions between the individual cylinder segments 3, 3' have no steps or jumps.

Figure 2:
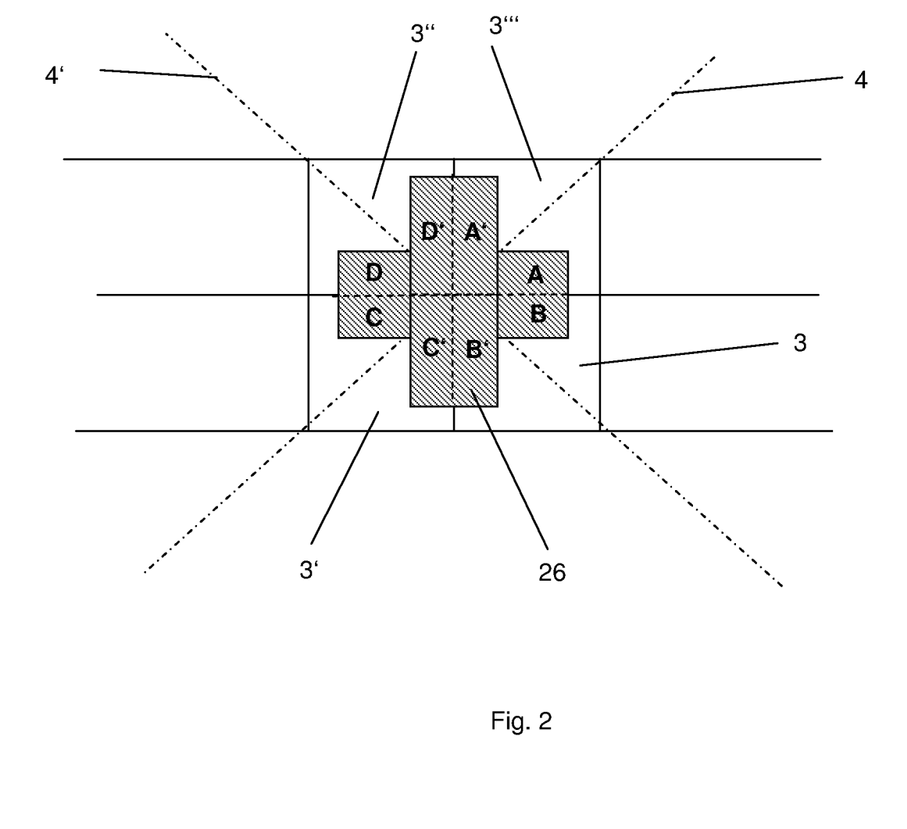
FIG. 2 shows a schematic view of a first embodiment of a device for beam, transformation.

FIG. 2 shows a schematic illustration of an incidence of a non-rotationally symmetric light beam 26 on four cylinder segments 3, 3', 3", 3'". The cylinder segments 3, 3', 3", 3'" each have a longitudinal cylinder axis 4, wherein the respective longitudinal cylinder axes 4, 4' are arranged at a 90° angle in relation to one another. An incident light emission consisting of the beam, surface elements A, B, C, D is respectively mirrored in a segment-by-segment fashion at the longitudinal cylinder axis 4, 4' of the cylinder segment 3, 3', 3", 3'" as a result of the curvature of the individual cylinder segments 3, 3', 3", 3'". Hence a transformed output beam with the beam surface elements A', B', C', D' is produced. The effect of the respective mirroring is therefore a rotation of the outer contour of the incident emission through 90°.

Figure 3:
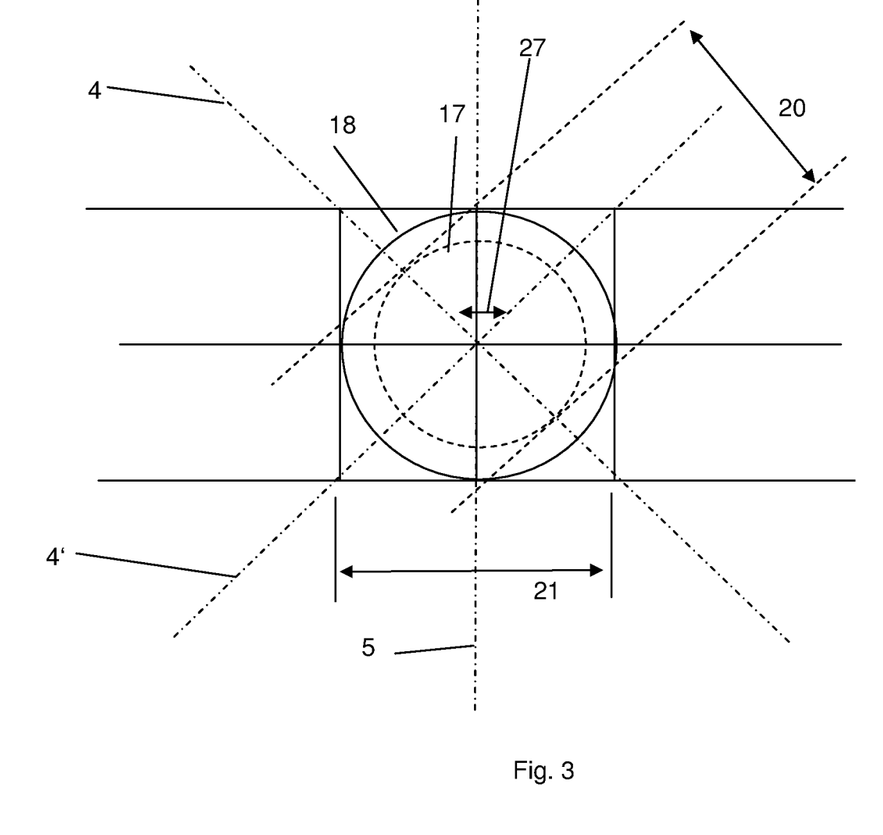
FIG. 3 shows a schematic view of the usable incoming radiation surface.

FIG. 3 shows an advantage of the arrangement from FIG. 2, in which the longitudinal cylinder axes 4, 4' are respectively formed at a 90° angle 27 in relation to one another and respectively formed at a 45° angle in relation to the longitudinal axis 5 of the beam transformation element 1. In the prior art, the usable beam diameter 17 was restricted by the cylinder width 20 of the respective cylinder. In the embodiment according to the invention of a beam transformation element 1, the usable region—the beam diameter 18—is larger by a factor of √2. The usable width 21 in the present invention comprises the whole surface of the cylinder segments 3. Therefore, a larger beam can pass through the beam transformation element 1, and so a better fill of an array is achieved. An improved fill of an array leads to an improved collimation, as a result of which better focusing is achieved. Hence, a higher power density is obtained.

Figure 4:
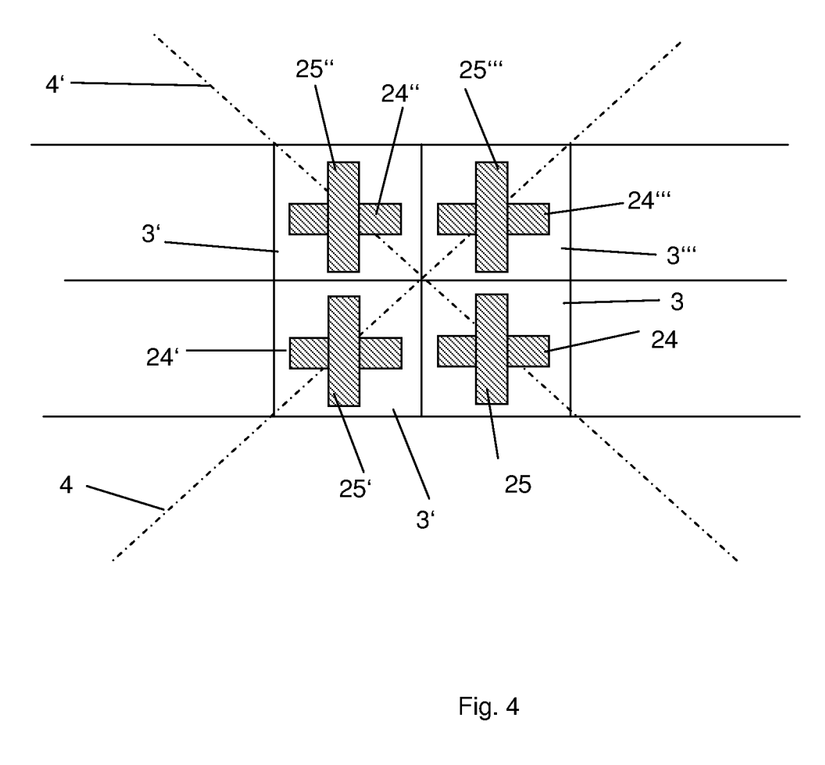
FIG. 4 shows a schematic view of a second embodiment of a device for beam transformation.

FIG. 4 shows a schematic view of a second embodiment, in which, for each cylinder segment 3, 3', 3", 3'", respectively one non-rotationally symmetric incident beam 24, 24', 24", 24'" is incident on the beam transformation element 1. Analogously to the embodiment from FIG. 3, the longitudinal cylinder axes 4, 4' are respectively arranged at a 90° angle with respect to one another. The respective light beam 24, 24', 24", 24'" incident on the cylinder segment 3, 3', 3", 3'" is mirrored at the respective longitudinal cylinder axis 4. The output light beam 25, 25', 25", 25'" is produced. Ultimately, the outer form of each light emission is rotated through 90°. Here, the use of a two-dimensional array for light emission leads to an increase in the power density and enables the combination of laser emissions in two dimensions.

Figure 5:
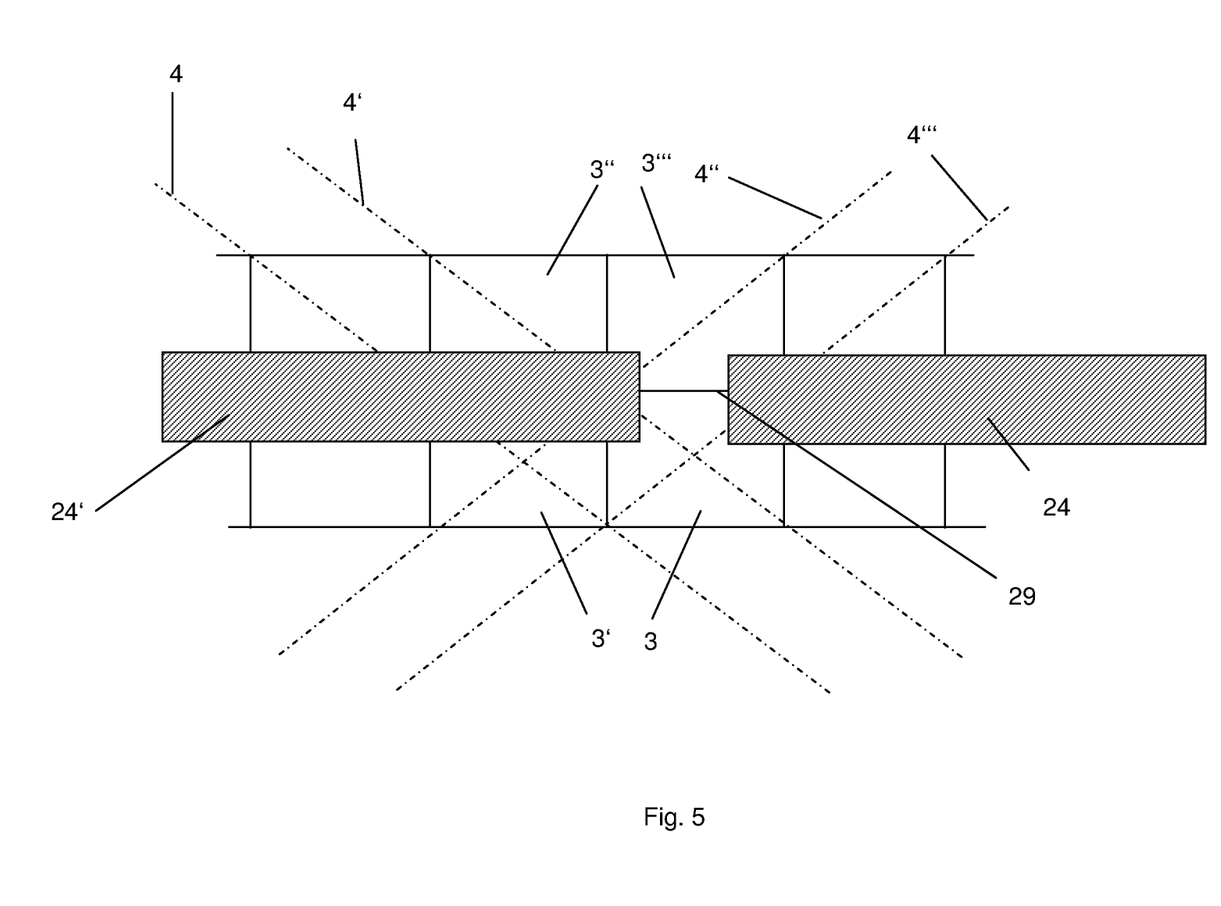
FIG. 5 shows a schematic view of a third embodiment of a device for beam transformation.

FIG. 5 shows a schematic view of a further embodiment of the device according to the invention for beam, transformation. The beam transformation element 1 is embodied in a manner analogous to the exemplary embodiments in FIGS. 3 and 4. Therefore, it comprises cylinder segments 3, 3', 3", 3'" which respectively have a longitudinal cylinder axis 4, 4', 4", 4'". The longitudinal cylinder axes 4, 4', 4", 4'" are arranged perpendicular to one another. The light beam 24, 24' incident in the respective cylinder segment 3, 3', 3", 3'" is mirrored at this longitudinal cylinder axis 4, 4', 4", 4'" (not depicted here). Therefore, as a result of the crossed form of the longitudinal cylinder axes 4, 4', 4", 4'", it is possible to design the beam transformation element 1 independently of the distance between the individual emitters for the light emission. The light emissions are preferably aligned along a horizontal central axis.

Figure 6:
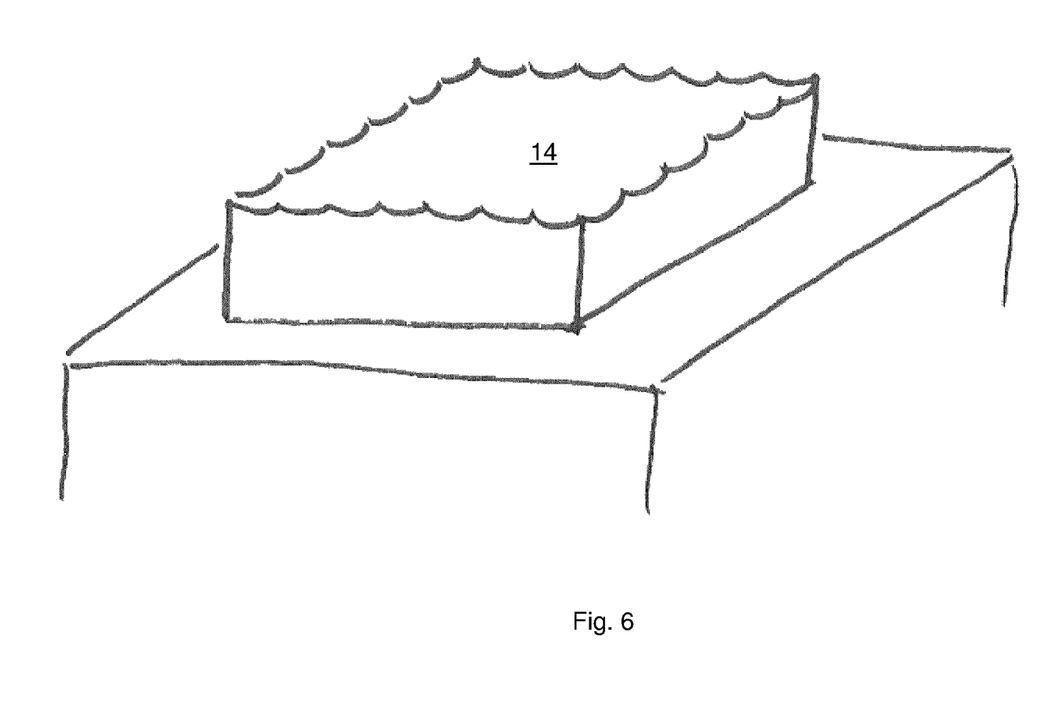
FIG. 6 shows a side view of a tool for blank pressing.

FIG. 6 shows a view of a tool 14 for blank pressing. Negatives of the crossed cylinders are introduced into the tool 14. Such a tool is used in a conventional blank pressing process. The upper tool part corresponds to the lower tool part, wherein it is rotated by 180°. Hence, a glass blank can be formed between the two tool halves into a blank for the beam transformation element 1, wherein the beam transformation element 1 comprises an incident radiation surface 2 and an output radiation surface 6, which are arranged symmetrically (see FIG. 1). The tool 14 is produced by milling spherical or aspherical cylinder tracks in a tool form blank. Here, initially, parallel first cylinder tracks are introduced, followed by cylinder tracks at an angle to the first cylinder tracks. Here, the angle is preferably 90°. Here, the orientation of the cylinder tracks is, in general, arbitrary, but preferably 90° are formed in relation to a side of the tool form blank.

Figure 7:
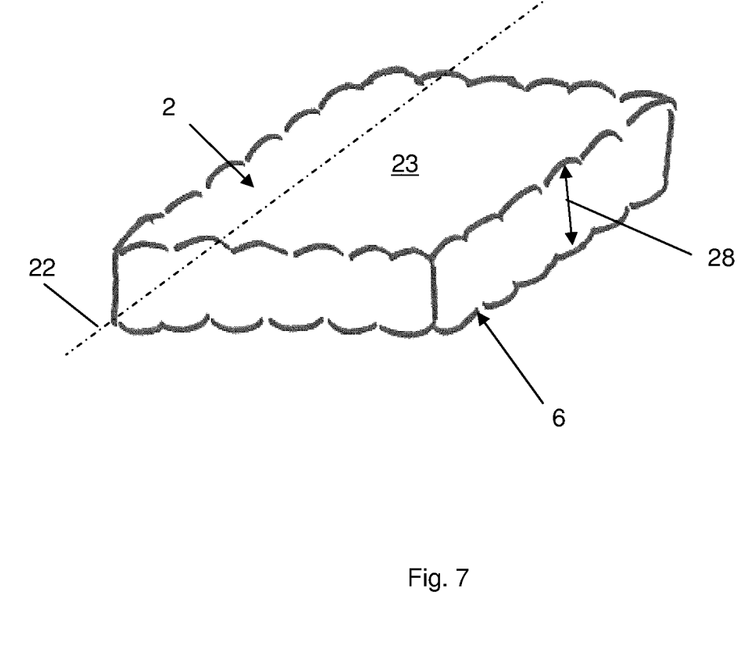
FIG. 7 shows a side view of a blank-pressed blank.
Figure 8:
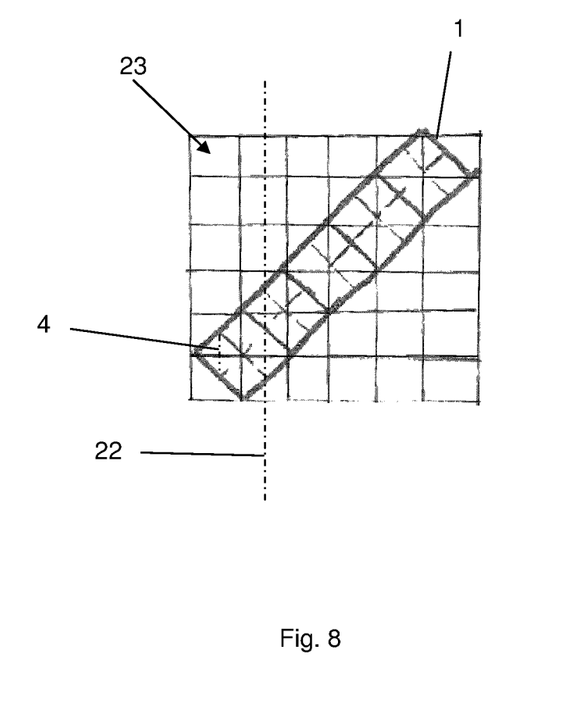
FIG. 8 shows a schematic view of a section through a blank for producing a beam transformation element.

FIG. 7 shows the blank 23 for a beam transformation element 1 produced using the tool 14 from FIG. 6. The cylinder axes 22 of the blank 23 are arranged at a 90° angle in relation to the longitudinal axis of the blank 23 or parallel to the longitudinal side of the blank 23. The maximum distance 28 between the incident radiation surface 2 and the output radiation surface 6 is therefore twice a focal length of the cylinder segments 3. Therefore, the focus of a cylinder segment 3 of the incoming radiation surface lies on the focus of the cylinder segment of the output radiation surface arranged opposite.

FIG. 3 shows a blank 23 from FIG. 7 in a plan view. A beam transformation element 1 is obtained by cutting out a segment which is arranged at a 45° angle to the cylinder axes 22 and to the longitudinal side of the blank. As already described in relation to FIGS. 1 to 5, the beam transformation element 1 has longitudinal cylinder axes 4, which are arranged at a 45° angle in relation to the longitudinal axis 5 of the beam transformation element 1.

Figure 9:
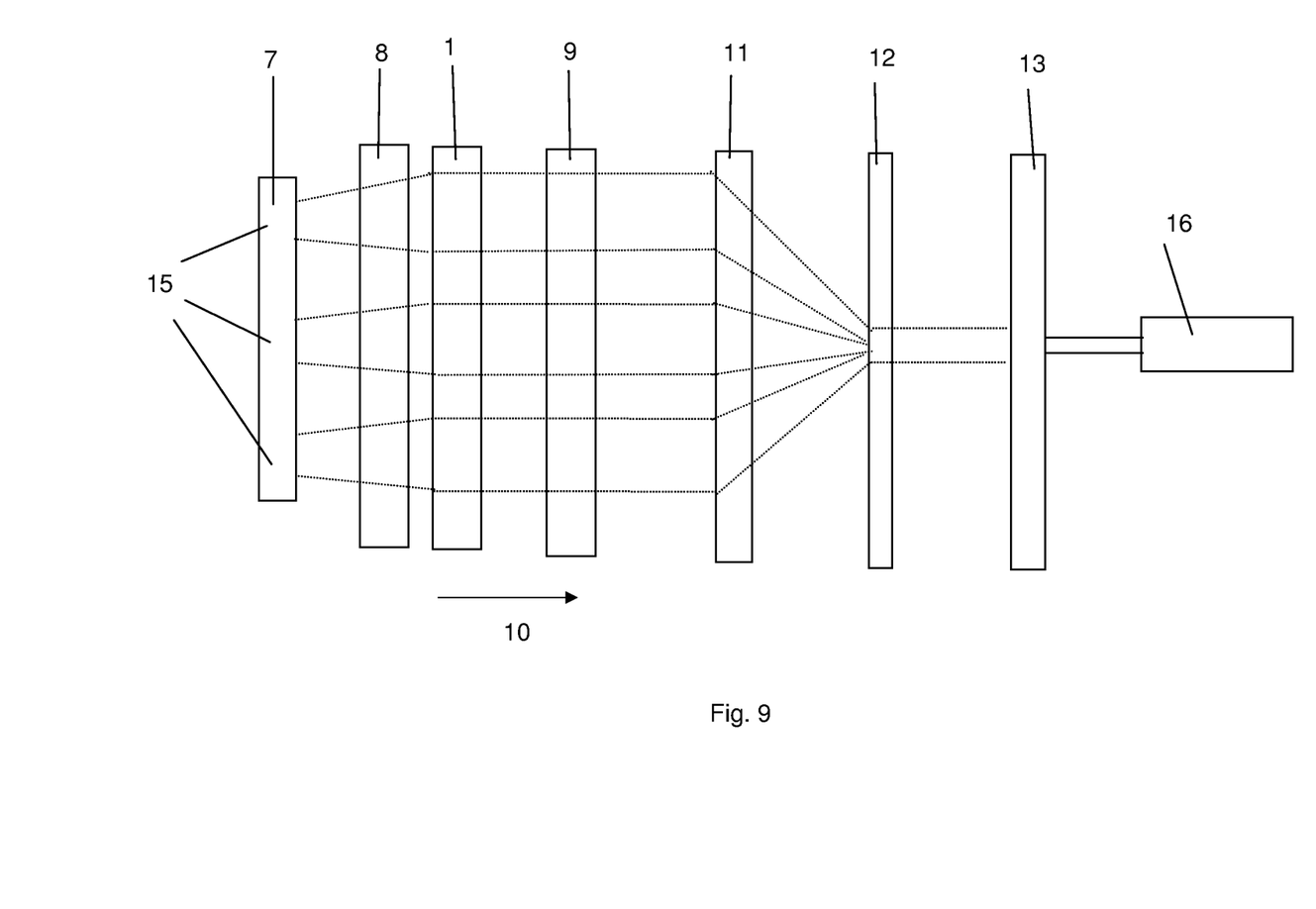
FIG. 9 shows a schematic view of a device for beam transformation in a preferred embodiment.

FIG. 9 shows a preferred application of a device for optical beam formation. Laser light from individual emitters 15 is emitted from, a laser light source 7 in the form of an array of diode lasers. The laser light comprises a slow axis and a fast axis. The emitted light is initially collimated along the fast axis by means of the first collimation device 8. After the first collimation, the laser emission passes through the beam transformation element 1, which generates a rotation of the outer contour of the laser emission by mirroring at the crossed longitudinal cylinder axes. The beam parameter product is symmetrized thus. After two-fold mirroring in the beam transformation element 1, the emission is collimated along the slow axis in a second collimation device 9. The combination lens 11 following in the direction of propagation 10 subsequently combines the individual emissions to form a beam.

Here, different wavelengths of the individual emitters are also possible. The dispersion element 12, which is arranged downstream of the combination lens 11 in the direction of propagation 10 of the laser emission, disperses the incident laser emission. The individual laser emissions are unified in one beam after the dispersion in the dispersion element 12.

Subsequently, the combined beam is partly reflected at a partly reflecting element 13. As a result of this reflection, the individual laser diodes are only stabilized with respectively one wavelength such that the laser diodes supply a stable output emission. The transmitted part of the partly reflecting element 13 is thereupon coupled into an optical fiber 16.

As a result of using the beam transformation element 1, the power density, which is transmitted into the optical fiber, can be optimized and the distances between the individual laser diodes can be selected freely in one embodiment, without the beam transformation element 1 needing to be interchanged. Moreover, it is possible to reduce the size of the cylindrical elements of the beam transformation element to such an extent that use can be made of diffractive elements.

The invention claimed is:

1. A beam transformation element for transforming electromagnetic radiation, the beam transformation element comprising:
   an incoming radiation surface and an output radiation surface,
   wherein the incoming radiation surface comprises at least four segments, the at least four segments being arranged such that each segment in a point to point arrangement with another segment either shares a same cylinder axis or has a parallel axis, and
   each segment having a convex embodiment,
   each segment has at least two adjacent segments, and
   each segment is part of a surface having a form of a cylinder or a cylinder portion,
   a first segment is part of a surface having the form of a first cylinder or a first cylinder portion having a first cylinder axis,
   and each adjacent segment of the first segment is part of a surface having the form of a cylinder or a cylinder portion, each adjacent segment having an adjacent cylinder axis, the first cylinder axis is not arranged parallel to each of the adjacent cylinder axes, and
   the output radiation surface is formed in a mirror symmetrical manner in relation to the incoming radiation surface,
   wherein each segment has four lateral boundary lines and/or each segment comprises a surface with four angles.

2. A device for optical beam transformation, comprising at least one laser light source and the beam transformation element as claimed in claim 1.

3. The device as claimed in claim 2, wherein the laser light source comprises semiconductor laser elements, and a distance between the semiconductor laser elements corresponds to a length of a cross section parallel to the longitudinal axis of the beam transformation element of two cylinder segments or of one cylinder segment or of less than one cylinder segment.

4. The device as claimed in claim 2, wherein the device comprises the following elements, through which the emissions from the laser light sources pass in the following sequence:
   a first collimation device for collimating the emission in the first plane; and
   a second collimation device for collimating the emission in the second plane.

5. The device as claimed in claim 2, wherein the at least one light source is an array of diode lasers with individual emitters; and the device further comprises
   a combination lens for combining individual emissions in a first dimension to form a combined beam;
   a dispersion element for receiving and transmitting the combined beam; and
   a partly reflecting element which partly decouples the combined beam and partly reflects the combined beam back into the emitters.

6. A method for producing a beam transformation element as claimed in claim 1, comprising the following steps:
   introducing a bi-cylindrical structure having a convex embodiment into an optical glass by a molding/forming method or by a lithography process.

7. A method for transforming an electromagnetic emission, wherein emissions are passed onto a beam transformation element as claimed in claim 1, wherein an emission of an emitter is transformed by either one or four or more cylinder segments having a convex embodiment.

8. The method as claimed in claim 7, wherein the emission is passed onto the beam transformation element in such a way that, if it is incident on a longitudinal cylinder axis of the at least one cylinder segment of the beam transformation element, which longitudinal cylinder axis is arranged at an angle of 45° to a fast axis of the electromagnetic emission, a rotation of the outer contour of the emission through 90° is achieved.

9. The method as claimed in claim 7, wherein the emissions from emitters are combined to form a combined beam and dispersed at a dispersive element.

10. The method as claimed in claim 9, wherein the combined beam is partly reflected back into the emitters.

11. The method as claimed in claim 7, wherein the emissions from the emitters are coupled into an optical fiber.

12. The method as claimed in claim 8, wherein the emissions are collimated in a direction of the fast axis and in a direction of a slow axis.

13. The beam transformation element as claimed in claim 1, wherein a distance between the incoming radiation surface and the output radiation surface corresponds to twice a focal length of the cylinder segments.

14. The device as claimed in claim 2, wherein a first collimation device is arranged between the laser light source and the beam transformation element, and a second collimation device is arranged downstream of the beam transformation element in a direction of propagation of the emission.

15. The method as claimed in claim 6 comprising the following step: separating out an array from the optical glass such that the longitudinal cylinder axes of the cylinder segments substantially have a 45° angle in relation to longitudinal and transverse sides of the array.

16. The method as claimed in claim 8, wherein the collimation of the fast axis is performed in a direction of propagation of the emission prior to the transformation in the beam transformation element.

17. The beam transformation element as claimed in claim 1, wherein there is at least one first segment having four adjacent segments, each having an adjacent cylinder axis, and the first cylinder axis is embodied in a manner not parallel to each of the adjacent cylinder axes.

18. The beam transformation element as claimed in claim 1, wherein the beam transformation element has a longitudinal axis and the first and adjacent axes of the segments are inclined by 45° in relation to the longitudinal axis of the beam transformation element and wherein the longitudinal axis corresponds to a side of a support area of the beam transformation element.

19. A beam transformation element for transforming electromagnetic radiation, the beam transformation element comprising:
   an incoming radiation surface and an output radiation surface,
   wherein the incoming radiation surface comprises at least four quadrilateral segments,
   each segment having a convex embodiment,
   each segment has at least two adjacent segments, and
   each segment is part of a surface having a form of a cylinder or a cylinder portion,
   a first segment is part of a surface having the form of a first cylinder or a first cylinder portion having a first cylinder axis,
   each adjacent segment to the first segment is a surface having the form of a cylinder or a cylinder portion, each adjacent segment having an adjacent cylinder axis,
   the first cylinder axis is perpendicular to each of the adjacent cylinder axes,
   the at least four quadrilateral segments being arranged such that each segment in a point to point arrangement with another segment either shares a cylinder axis or has a parallel axis, and
   the output radiation surface is formed in a mirror symmetrical manner in relation to the incoming radiation surface.

* * * * *